United States Patent [19]

Glance

[11] Patent Number: 4,723,316
[45] Date of Patent: Feb. 2, 1988

[54] POLARIZATION INDEPENDENT COHERENT OPTICAL HETERODYNE RECEIVERS

[75] Inventor: Bernard Glance, Colts Neck, N.J.

[73] Assignee: American Telephone & Telegraph Company, AT&T Bell Laboratories, Murray Hill, N.J.

[21] Appl. No.: 860,823

[22] Filed: May 8, 1986

[51] Int. Cl.$^4$ ............................................. H04B 9/00
[52] U.S. Cl. .................................................. 455/619
[58] Field of Search ............... 455/609, 616, 617, 619; 370/2; 329/144; 356/349, 351

[56] References Cited

U.S. PATENT DOCUMENTS 3,215,840  11/1965  Buhrer .................. 250/199
3,975,628  8/1976   Graves et al. ........... 250/199
4,506,388  3/1985   Monerie et al. ......... 455/619

FOREIGN PATENT DOCUMENTS 59-122140  7/1984  Japan .................. 370/2
60-172842  9/1985  Japan .................. 455/619

OTHER PUBLICATIONS

Bachus et al., Jrnl. Lightwave Tech., vol. LT-2, No. 4, Aug. 1984, pp. 381-384.
Abbas et al., Globecom '83, San Diego, Calif., Nov. 28-Dec. 1, 1983, vol. 1, pp. 12.5.1-12.5.6.
Shikada et al., Trans. IECE Japan, vol. E67, No. 6, Jun., 1984, pp. 337-338.
Nicholson, Electronic Let., vol. 20, No. 24, 22 Nov. 1984, pp. 1005-1007.
Pratt, Laser Communications Systems, J. Wiley & Sons, 1969, pp. 38-40, 183-190, 224-231.
Wrixon, 8th European Microwave Conf., Paris, France, 4-8 Sep. 1978, pp. 717-719.
Bachus et al., Electronic Let., vol. 19, No. 17, 18, Aug., 1983, pp. 671-672.

*Primary Examiner*—Joseph A. Orsino, Jr.
*Attorney, Agent, or Firm*—Erwin W. Pfeifle

[57] ABSTRACT

The present invention relates to coherent optical heterodyning receivers which mix a received optical signal, including an arbitrary polarization state, and a local oscillator signal, including a fixed polarization state, while providing a performance which is independent of the polarization direction of a received signal. In one receiver version, the received signal is heterodyned using only a portion of the local oscillator signal, while in a second receiver version, the entire local oscillator signal is used. The combined polarized signals are split in a polarizing beam splitter between the two orthogonal polarization axes for propagation in separate branches. Each branch includes a photodetector and means for processing the resulting photodetector output signal to retrieve the modulation information from the processed signal. The sum of the two demodulated signals from the two branches provides a baseband signal independent of the polarization state of the received optical signal.

5 Claims, 4 Drawing Figures

POLARIZATION INDEPENDENT COHERENT OPTICAL HETERODYNE RECEIVERS

TECHNICAL FIELD

The present invention relates to polarization independent optical heterodyne receivers and, more particularly, to polarization independent optical heterodyne receivers wherein signals may be received in arbitrary polarized states and mixed with an optical local oscillator signal with a fixed polarization state such that the output signal from the receiver is independent of the polarization state of the received signal.

DESCRIPTION OF THE PRIOR ART

Optical heterodyne receivers are known in the art and comprise configurations as shown, for example, in U.S. Pat. No. 3,215,840 issued to C. F. Buhrer on Nov. 2, 1965, and the article by G. T. Wrixon presented in the 8th European Microwave Conference, Paris, France, Sept. 4–8, 1978, at pages 717–719. In a conventional coherent optical communication system, the polarization of the received signal must be linear and aligned with the polarization axis of the local optical signal of the receiver. A departure from this condition rapidly degrades the performance of the coherent receiver. Such a degradation is likely to occur in a coherent fiber communication system because the polarization alignment between the two signals cannot be maintained permanently due to deformations of the fiber that randomly change the polarization state of the received signal.

The use of a polarization maintaining fiber can solve such problem. Unfortunately, this option is likely to be precluded by the impossibility of changing the fibers of existing optical communication systems. An alternative solution consists of using an adaptive polarization technique. Such a system measures the polarization state of the received signal and uses this information to control the polarization of the received signal. This technique usually relies on an electro-mechanical or electro-optical feedback loop which may not be the most desirable solution for a communication system.

Therefore, the problem remaining in the prior art is to provide a coherent optical heterodyne receiver which is independent of the polarization state of the received signal to avoid the deficiencies of the prior art optical heterodyne receivers.

SUMMARY OF THE INVENTION

The foregoing problem in the prior art has been solved in accordance with the present invention which relates to coherent optical heterodyne receivers for, for example, DPSK signals which can accept an optical input signal including an arbitrary polarization state which is mixed with an optical local oscillator signal with a fixed polarization state to generate an electrical output signal which is independent of the polarization of the received signal.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 4:
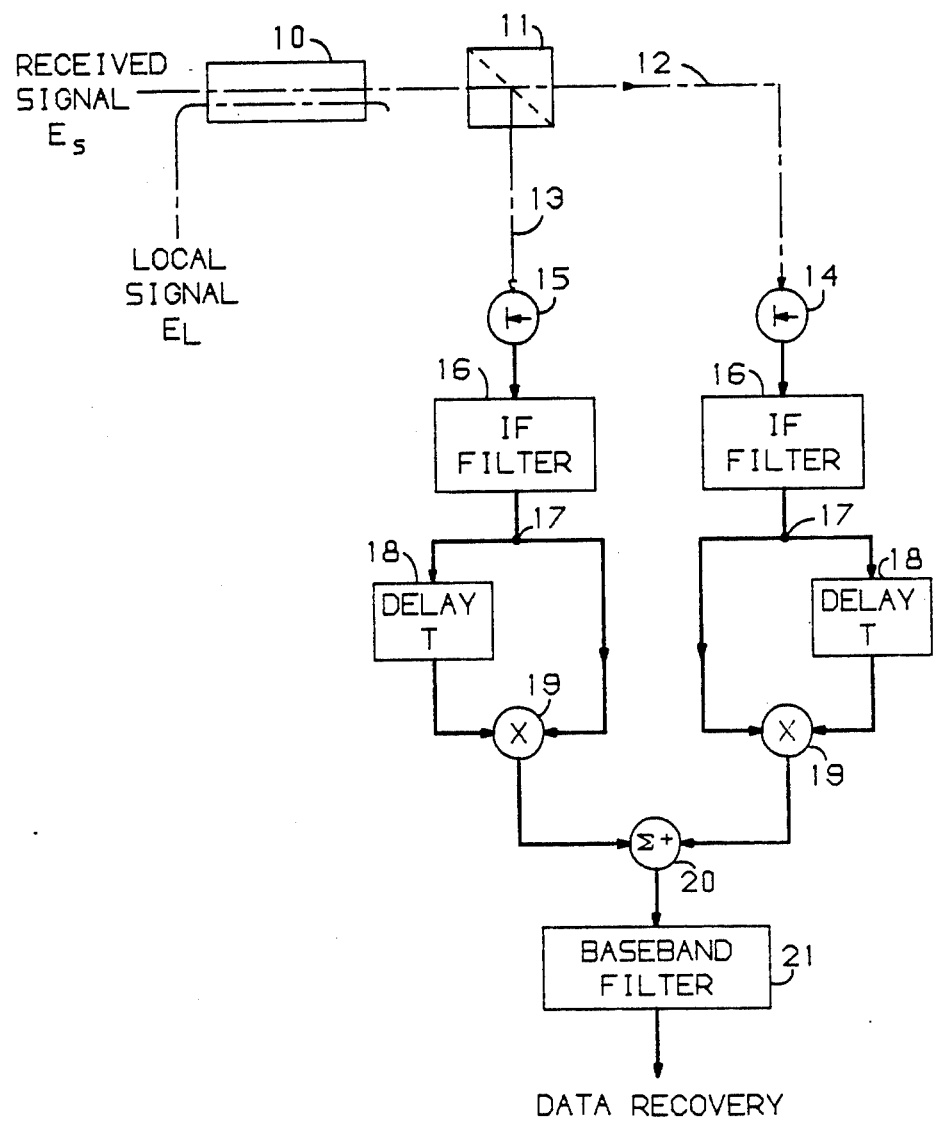
FIG. 4 is a block schematic of an alternative arrangement of the polarization independent optical heterodyne receiver shown in FIG. 1 which uses only a fraction of the power supplied by the local optical signal for heterodyning.

FIG. 4 is a block schematic of a coherent optical heterodyning receiver in accordance with the present invention whose performance is independent of the polarization state of the received optical signal. The effect of the polarization is eliminated by simple signal processing at the Intermediate Frequency (IF) frequency. The received optical signal, $E_S$, is a Differential Phase Shift Keyed (DPSK) signal.

In FIG. 4, the received polarized optical signal, $E_S$, is combined with a polarized optical local oscillator signal, $E_L$, in a directional coupler 10, and the combined signals $E_S + E_L$ are directed to a polarizing beam splitter 11. Polarizing beam splitter 11 functions to direct the combined signals in a first polarization direction into a first branch 12 and the combined signals in a second orthogonal polarization direction into a second branch 13. The signals propagating in branches 12 and 13 are detected by a first and a second photodetector 14 and 15, respectively.

More particularly, the two polarization directions are defined by the two polarization axes of polarizing beam splitter 11. The local oscillator optical source, not shown, being used for heterodyning, is assumed to be linearly polarized. This local oscillator signal of power $P_L$, radial frequency $\omega_L$ and phase noise $\theta_L(t)$ is given by $$E_L(t) = \sqrt{2P_L}\, \cos[\omega_L t + \theta(t)] \quad (1)$$

This signal power is equally divided between the two polarization axes of polarizing beam splitter 11. Assuming that the two photodetectors have the same quantum efficiency, this can be accomplished by rotating polarizing beam splitter 11 until the two photodetectors 14 and 15 provide the same current from the signal from, for example, the local oscillator only. Under these conditions, the optical local oscillator signals seen by photodetectors 14 and 15 for the horizontal and vertical polarization directions are $$E_{LH}(t) = \sqrt{P_L}\, \cos[\omega_L t + \theta_L(t) + \alpha_H] \quad (2)$$

and $$E_{LV}(t) = \sqrt{P_L}\, \cos[\omega_L t + \theta_L(t) + \alpha_V]. \quad (3)$$

The quantities $\alpha_H$ and $\alpha_V$ represent two arbitrary independent phases which depend on the state-of-polarization of $P_L$, the optical directional coupler 10, polarizing beam splitter 11 and the respective paths seen by the two optical signals $E_s$ and $E_L$.

When the received signal, $E_s$, is linearly polarized, its value along its polarization axis is given by $$E_s(t) = \sqrt{2P_s}\, M(t)\cos[\omega_s t + \theta_s(t)] \tag{4}$$

where $P_s$ is the signal power, $\omega_s$ the radial frequency, and $\theta_s(t)$ the phase noise. The quantity $M(t)$ represents the DPSK modulation given by $$\sum_k a_k P(t - KT),$$

with $a_k$ equal to $+1$ or $-1$ during each bit of duration T having the pulse shape $P(t)$. Under general conditions, the polarization of the received signal, $E_s$, fluctuates randomly between all possible states of polarization. In this case, the received signal added to the local oscillator signal, $E_L$, by means of directional coupler 10 is split between the two polarization axes of polarizing beam splitter 11. The resulting optical signals seen by photodetectors 14 and 15 are $$E_{sH}(t) = \beta\sqrt{2P_s}\, M(t)\cos[\omega_s t + \theta_s(t) + \delta_H] \tag{5}$$

and $$E_{sV}(t) = \sqrt{1-\beta^2}\,\sqrt{2P_s}\, M(t)\cos[\omega_s t + \theta_s(t) + \delta_V], \tag{6}$$

respectively, where $\beta\sqrt{2P_s}$ and $\sqrt{1-\beta^2}\sqrt{2P_s}$ are the magnitudes of the received signal in the respective two polarization axes. The quantities $\delta_H$ and $\delta_V$ depend on the phases of the polarization components of the received signal, $E_s$, measured relative to the polarization axes of polarizing beam splitter 11. They also include the arbitrary, independent phase shifts introduced by directional coupler 10, the beam splitter 11, and the respective paths seen by the two signals.

The currents provided by photodetectors 14 and 15 at the IF frequency $\Omega = \omega_1 - \omega_2$ resulting from the signals of Equations (2)+(5) and Equations (3)+(6) are $$i_H(t) = \frac{2\pi\eta e}{h\omega}\sqrt{2P_sP_L}\,\{\beta M(t)\cos(\Omega t + \phi_H) + x_1(t)\cos(\Omega t + \phi_H) + y_1(t)\sin(\Omega t + \phi_H)\} \tag{7}$$

and $$i_V(t) = \frac{2\pi\eta e}{h\omega}\sqrt{2P_sP_L}\,\{\sqrt{1-\beta^2}\, M(t)\cos(\Omega t + \phi_V) + x_2(t)\cos(\Omega t + \phi_V) + y_2(t)\sin(\Omega t + \phi_V)\}. \tag{8}$$

The quantity $\eta$ represents the quantum efficiency of the photodiodes; h is Planck's constant, $\omega$ is the optical frequency and e is the charge of the electron. The phase terms are given by $$\phi_H = \theta_1(t) - \theta_2(t) + \delta_H - \alpha_H \tag{9}$$

and $$\phi_V = \theta_1(t) - \theta_2(t) + \delta_V - \alpha_V. \tag{10}$$

The remaining terms represent the shot noise generated in the IF bandwidth assumed to be equal to 1/T. Assuming that $P_L >> P_s$, the shot noise terms are gaussian random variables of zero-mean and variance $$\sigma = \sqrt{\frac{h\omega}{4\pi\eta P_s T}} = \sqrt{\frac{1}{2N}} \tag{11}$$

where N is the average number of photons/bit.

In branch 12, after photodetector 14, the output signal from photodetector 14 is passed through an IF filter 16 which functions to pass only the IF frequencies and reject all other frequencies. The resultant IF signal is divided equally by a dividing means 17 which can comprise, for example, a solder joint. The two portions of the divided signal propagate along separate paths, with one path including a delay means 18 for providing a delay of T seconds equal to one bit duration. The delayed and undelayed portions of the signal from filter 16 are multiplied in a multiplier 19. The same elements 16–19 are included in branch 13 for processing the signal from photodetector 15 in a similar manner. The two signals from multipliers 19 in branches 13 and 14 are added in an adder 20 to yield a baseband signal which is filtered in a baseband filter 21 to ensure only a baseband signal providing data recovery.

More particularly, the information $M(t)\,M(t-T)$ is retrieved separately in the two branches 12 and 13 of the receiver as in a single branch conventional DPSK receiver. This is done by multiplying one-half of the IF current by the other half delayed by one bit duration T in multiplier 19 of each branch. This process provides a baseband signal whose magnitude is the square of the IF current magnitude and whose phase is equal to the phase difference between the two halves of the IF current. Providing that the IF frequency is adjusted to yield $\Omega T = 2n\pi$, and that the polarization state of the received signal, $E_s$, is quasi-constant over a bit duration, the phase of the two baseband signals in the two branches 12 and 13 is the same and equal to $$\Delta\phi(t) = [\theta_1(t) - \theta_2(t)] - [\theta_1(t-T) - \theta_2(t-T)]. \tag{12}$$

Thus, the baseband signals are proportional to $$V_H(t) = 2P_sP_L\{\beta^2 M(t)M(t-T)\cos[\Delta\phi(t)] + n_1(t)\} \tag{13}$$

and $$V_V(t) = 2P_sP_L\{(1-\beta^2)M(t)M(t-T)\cos[\Delta\phi(t)] + n_2(t)\} \tag{14}$$

where $n_1(t)$ and $n_2(t)$ are due to the noise terms in Equations (7) and (8), respectively. The magnitudes of the desired component of Equations (13) and (14) are respectively proportional to the received signal power in the horizontal and vertical polarization. Thus, the sum of the two signals yields the baseband signal $$V(t) = 2P_sP_L\{M(t)M(t-T)\cos[\Delta\phi(t)] + n_1(t) + n_2(t)\} \tag{15}$$

which is independent of the polarization state of the received signal.

The optical heterodyne receiver of FIG. 4 provides performance independent of the polarization state of the received signal. The result is obtained by demodulating separately the signals received in the two polarization axes of a polarizing beam splitter 11 and adding these signals prior to detecting the data. The excess noise due to using two branches 12 and 13 degrades the performance of the receiver by about 0.4 dB as compared to the performance obtained by an ideal conventional DPSK heterodyne receiver, but provides the advantage of the performance stated above. A conventional DPSK heterodyne receiver would include, in series, the directional coupler 10 and one branch including a photodetector (either 14 or 15) and the associated IF filter 16, divider 17, delay 18 and multiplier 19. The problem with the conventional receiver is that the polarization directions of the signals must be matched or, for example, $\beta$ in Equations (5) and (6) approaches zero and no output signal is obtained. The disadvantage of the receiver of FIG. 4 is that the received signal is combined with the local oscillator signal by means of a directional coupler 10 quasi-transparent to the received signal. Thus, most of the local oscillator signal, $E_L$, is wasted in the unused fourth arm of directional coupler 10 which is not connected to an optical path.

Figure 1:
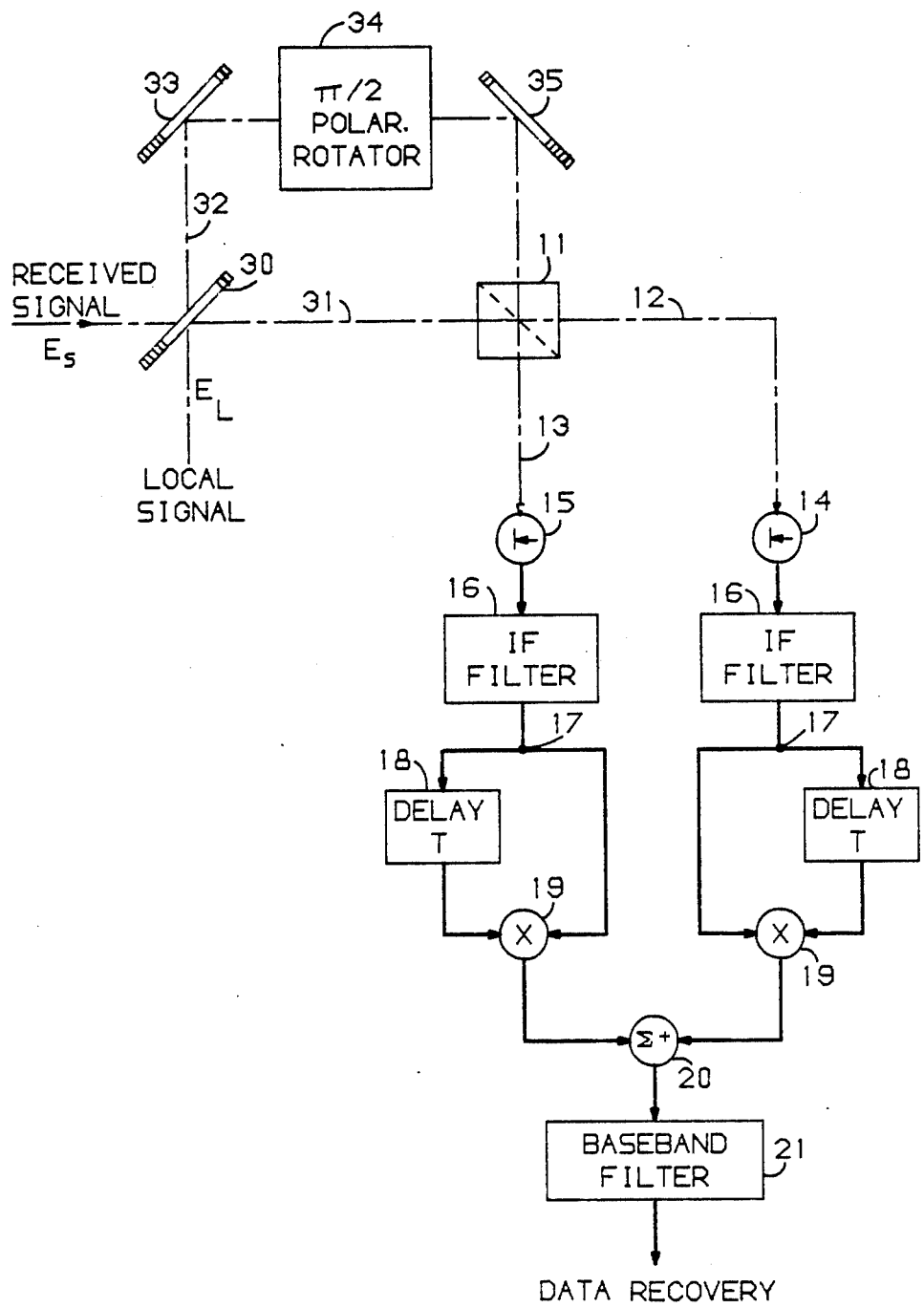
FIG. 1 is a block schematic of preferred arrangement of a polarization independent optical heterodyne receiver in accordance with the present invention which uses the entire available local signal for heterodyning.

FIG. 1 illustrates a more efficient and, therefore, a preferred arrangement of the optical heterodyne receiver in accordance with the present invention. Instead of a directional coupler 10, as shown in FIG. 4, the receiver of FIG. 1 uses a mixer arrangement, as disclosed in a co-pending patent application filed for the present inventor on the same day, which is shown to include a 3 dB beam splitter 30, a first mirror 33, a $\pi/2$ polarization rotator 34 and a second mirror 35. The 3 dB beam splitter 30 functions to both (a) combine the received signal, $E_s$, and the local oscillator signal, $E_L$, and (b) transmit substantially equal portions of the combined signals $E_s + E_L$ along substantially perpendicular first and second paths 31 and 32. One of paths 31 or 32 includes a $\pi/2$ polarization rotator 34.

For purposes of illustration and not for purpose of limitation, the receiver shown in FIG. 1 disposes the polarization rotator 34 in path 32. It is to be understood, however, that polarization rotator 34 could be disposed in path 31 instead. The polarization direction of the combined signal portion propagating along second path 32 is rotated by $\pi/2$ radians while exemplary mirrors 33 and 35 redirect the beam to arrive a polarizing beam splitter 11 substantially perpendicular to the direction of the beam propagating along path 31. The two inputs to polarizing beam splitter 11 are transparent and reflective to a first and a second orthogonal orientation of polarization, respectively. Thus, the receiver arrangement of FIG. 1 differs from the arrangement of FIG. 4 by the substitution of both a 3 dB beam splitter 30 and a polarization rotator 34 for the directional coupler 10, with the remaining circuitry remaining unchanged.

Figure 2:
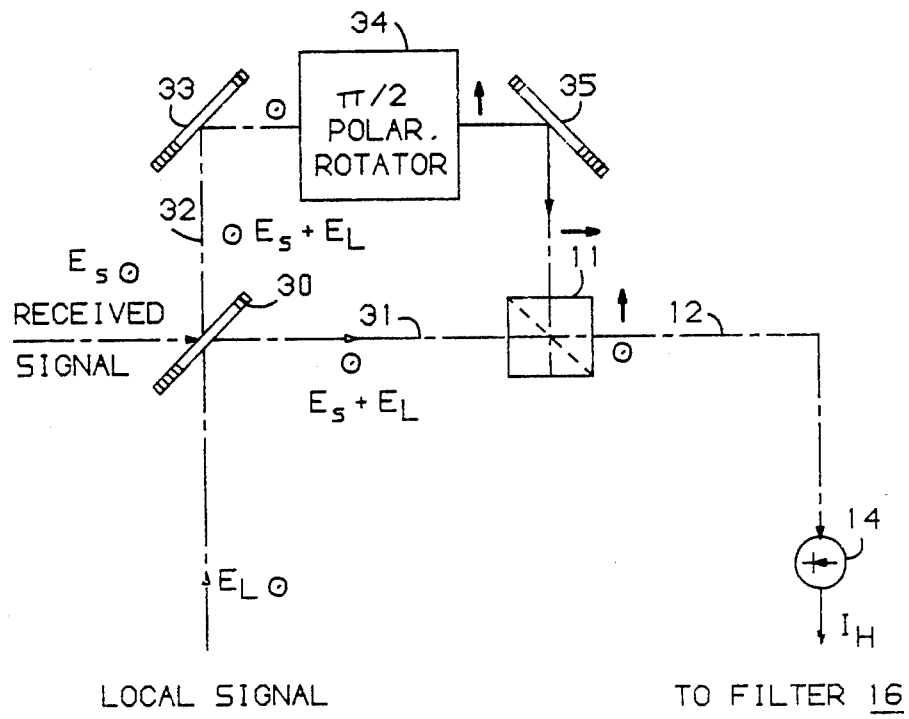
FIG. 2 is a block schematic showing the detection of the horizontal polarization component of the received signal in the arrangement of FIG. 1.

The operating mode of the receiver of FIG. 1 can be seen by first considering only the components of the received signal, $E_s$, and the local oscillator signal, $E_L$, which exit polarizing beam splitter 11 on the same axis, e.g., branch 12, as shown in FIG. 2. For purposes of illustration, the input polarization of these components will be defined as horizontal and denoted by the symbols of a dot surrounded by a circle as shown in FIG. 2. The horizontally polarized component of the received signal can be expressed as $$E_{s\odot} = \sqrt{2\beta^2 P_s}\, M(t)\cos[\omega_1 t + \theta_1(t) + \alpha_\odot] \quad (16)$$

The quantity $\beta^2$ denotes the fraction of the signal power $P_s$ received in this polarization direction; $M(t)$ represents the signal DPSK modulation; $\omega_1$ is the radial frequency; $\theta_1(t)$ is the phase noise and $\alpha_\odot$ is a slowly fluctuating phase depending on the polarization state of the received signal. The local oscillator signal is assumed to be linearly polarized in a plane which distributes the input power equally between the two outputs of the polarizing beam splitter. Thus, the horizontal component of this signal is $$E_{L\odot} = \sqrt{P_L}\, \cos[\omega_2 t + \theta_2(t)] \quad (17)$$

where $P_L$ represents the signal power supplied by the local optical source; $\omega_2$ is the radial frequency and $\theta_2(t)$ is the phase noise.

The signals from Equations (16) and (17) are combined by 3 dB beam splitter 30 into two beams. The beam directed toward the polarizing beam splitter along path 31 traverses this device to go into branch 12 of the receiver. This beam yields at photodetector 14 of this branch $$E_{\odot A} = \quad (18)$$

$$\tfrac{1}{2}\Biggl( \sqrt{2\beta^2 P_s}\, M\!\left(t + \tfrac{L_1}{v}\right) \cos\!\left[\omega_1\!\left(t + \tfrac{L_1}{v}\right) + \theta_1\!\left(t + \tfrac{L_1}{v}\right) + \phi_T + \phi'_T + \alpha_\odot + \delta_A \right] +$$

$$\sqrt{P_L}\, \cos\!\left[\omega_2\!\left(t + \tfrac{L_1}{v}\right) + \theta_2\!\left(t + \tfrac{L_1}{v}\right) + \phi_R + \phi'_T + \delta_A \right] \Biggr)$$

The quantity $L_1/v$ represents the time delay sustained by the beam propagating along the distance $L_1$, separating 3 dB beam splitter 30 from the polarizing beam splitter 11. The phases $\phi_T$ and $\phi_R$ are phase shifts introduced, by the transmission and reflection, respectively, at 3 dB beam splitter 30. These phase shifts are related by $$\phi_T - \phi_R = \pi/2 \quad (19)$$

Similar phase shifts $\phi'_T$ and $\phi'_R$ are introduced by polarizing beam splitter 11. The last term $\delta_A$ represents the phase due to the path separating photodetector 14 from polarizing beam splitter 11.

The other beam propagating along path 32 provided by 3 dB beam splitter 30, has its polarization axis rotated by $\pi/2$ radians by polarization rotator 34. This polarization direction is defined as the vertical axis and is denoted by the symbol $\uparrow$. The resulting beam is then directed toward the other input of polarizing beam splitter 11 by exemplary mirrors 33 and 34, which beam direction is substantially perpendicular to the first beam input from path 31. The incoming beam in path 32, being vertically polarized, is reflected by polarizing beam splitter 11 into branch 12 of the receiver yielding at photodetector 14 of this branch $$E_{\uparrow A} = \quad (20)$$

-continued $$\frac{1}{2}\left\{ \sqrt{2\beta^2 P_s}\, M\left(t + \frac{L_2}{v}\right) \cos\left[\omega_1\left(t + \frac{L_2}{v}\right) + \right.\right.$$

$$\left. \theta_1\left(t + \frac{L_2}{v}\right) + \phi_R + \phi'_R + \alpha_\odot + \delta_A \right] +$$

$$\sqrt{P_L} \cos\left[\omega_2\left(t + \frac{L_2}{v}\right) + \theta_2\left(t + \frac{L_2}{v}\right) + \right.$$

$$\left.\left. \phi_T + \phi'_R + \delta_A \right] \right\}$$

The quantity $L_2$ represents the distance traveled by this beam between 3 dB beam splitter 30 and polarizing beam splitter 11. Note that the signals of Equations (16) and (17) provide no output signal into branch 13 of the receiver.

Figure 3:
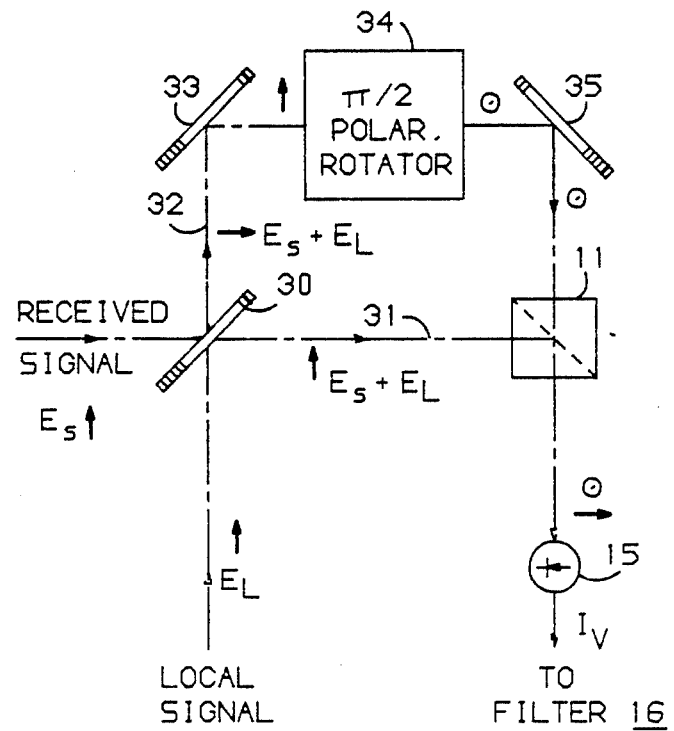
FIG. 3 is a block schematic showing the detection of the vertical polarization component of the received signal in the arrangement of FIG. 1.

Consider now the polarization components of the received signal and the local oscillator signal which are perpendicular relative to the signals of Equations (16) and (17) as shown in FIG. 3. The value of these signals are, respectively, $$E_{s\uparrow} = \sqrt{2(1-\beta^2)P_s}\, M(t)\cos[\omega_1 t + \theta_1(t) + \alpha_\uparrow] \quad (21)$$

and $$E_{L\uparrow} = \sqrt{P_L}\, \cos[\omega_2 t + \theta_2(t)] \quad (22)$$

The quantity $(1-\beta^2)P_s$ represents the signal power received in this polarization and $\alpha_\uparrow$ is a phase which depends, as $\alpha_\odot$, on the polarization state of this signal.

The signals of Equations (21) and (22) are combined by 3 dB beam splitter 30 into two beams. In this case, the beam directed toward polarizing beam splitter 11 along path 31 is reflected by this device into branch 13 of the receiver because polarizing beam splitter 11 is reflective to the polarization direction of this beam. This beam yields at photodetector 15 of branch 13

$$E_{\uparrow B} = \quad (23)$$

$$\frac{1}{2}\left\{ \sqrt{2(1-\beta^2)P_s}\, M\left(t + \frac{L_1}{v}\right) \cos\left[\omega_1\left(t + \frac{L_1}{v}\right) + \right.\right.$$

$$\left. \theta_1\left(t + \frac{L_1}{v}\right) + \phi_T + \phi'_R + \alpha_\uparrow + \delta_B \right] +$$

$$\sqrt{P_L} \cos\left[\omega_2\left(t + \frac{L_1}{v}\right) + \theta_2\left(t + \frac{L_1}{v}\right) + \right.$$

$$\left.\left. \phi_R + \phi'_R + \delta_B \right] \right\}.$$

The quantity $\delta_B$ represents a phase similar to $\delta_{A\odot}$. The polarization of the second beam provided by 3 dB beam splitter 30 and propagating along path 32 is rotated by $\pi/2$ radians by polarization rotator 34. As a result, this beam traverses polarizing beam splitter 11 into the direction of branch 13 of the receiver and yields at photodetector 15 of receiver branch 13

$$E_{\odot B} = \quad (24)$$

$$\frac{1}{2}\left\{ \sqrt{2(1-\beta^2)P_s}\, M\left(t + \frac{L_2}{v}\right) \cos\left[\omega_1\left(t + \frac{L_2}{v}\right) + \right.\right.$$

$$\left. \theta_1\left(t + \frac{L_2}{v}\right) + \phi_R + \phi'_T + \alpha_\uparrow + \delta_B \right] +$$

$$\sqrt{P_L} \cos\left[\omega_2\left(t + \frac{L_2}{v}\right) + \theta_2\left(t + \frac{L_2}{v}\right) + \right.$$

$$\left.\left. \phi_T + \phi'_T + \delta_B \right] \right\}$$

Note that signals of Equations (21) and (22) feed only branch 13 of the receiver while, as shown before, the signals of Equations (16) and (17) feed only branch 12 of the receiver. Thus, the two polarization components of the received signal can be processed independently as in the receiver of FIG. 4.

The photodetector of each branch is fed by two perpendicularly polarized signals. For example, branch 12 is fed the horizontally polarized combined signal pattern from path 31 and the vertically polarized combined signal portions from path 32 as shown in FIG. 2. Therefore, these signals are detected independently, contributing equally to the IF current at the radial frequency $\Omega = \omega_1 - \omega_2$. Assuming that $L_1$ and $L_2$ are selected to satisfy the condition $$\frac{\Omega(L_2 - L_1)}{v} = \pi \quad (25)$$

and providing that the quantities $M(t)$, $\theta_1(t)$ and $\theta_2(t)$ vary little over the time interval $(L_2-L_1)/v$, the IF current supplied by the two photodetectors 14 and 15 are, respectively, $$I_{14} \approx \frac{2\pi\eta e}{h\omega} \sqrt{2\beta^2 P_s P_L}\, M(t')\cos[\Omega t' + \theta_1(t') - \quad (26)$$

$$\theta_2(t') + \alpha_\odot] + n_H(t')$$

and $$I_{15} \approx \frac{2\pi\eta e}{h\omega} \sqrt{2(1-\beta^2)P_s P_L}\, M(t')\cos[\Omega t' + \theta_1(t') - \quad (27)$$

$$\theta_2(t') + \alpha_\uparrow] + n_V(t')$$

The quantity $\eta$ represents the quantum efficiency of the photodiodes; e is the charge of an electron; h is Planck's constant, and t' is the delayed time $t+(L_1+L_2)/2v$. The last two quantities $n_H(t')$ and $n_V(t')$ represent the shot noise generated by the detection process, which now can more easily dominate the receiver noise since the entire power of the local signal is available for heterodyning.

The remaining signal processing is identical to that described for the receiver of FIG. 4. Therefore, the receiver yields the same performance independent of the polarization of the received signal, providing that the signal modulation and the phase noise vary little over one-half of an IF period.

From the foregoing discussion, it can be seen that the present receiver arrangements are independent of the polarization state of the received signal, $E_s$. It is to be understood that the local oscillator signal, $E_L$, is fixed in its polarization direction, but that the received signal $E_s$, can randomly change during transmission and may be linear and aligned with the local oscillator signal, then each of branches 12 and 13 will provide substantially equal currents, because of the alignment with polarization beam splitter 11, which currents are added in adder 20 to provide a predetermined signal level. If the received signal, however, randomly changes so that it is not linear and aligned with the local oscillator signal, then one of the branches 12 and 13 will provide a current which is greater than that provided when the signals were linear and aligned, while the other branch provides a correspondingly smaller current. When the currents from both branches 12 and 13 are added under this latter condition, then it can be seen that the added currents still provide the same predetermined signal level as found with the linear and aligned signals. Therefore, the present optical heterodyne receiver arrangements provide performance which is independent of the polarization state of the received signal and permits the changing of fibers in existing optical communication systems without a deleterious effect.

It is to be understood that the above-described embodiments are simply illustrative of the principles of the invention. Various other modifications and changes may be made by those skilled in the art which will embody the principles of the invention and fall within the spirit and scope thereof. For example, in FIGS. 1-3, the $\pi/2$ polarization rotator 34 could be disposed in path 31 instead of in path 32. Under such conditions the signals normally received by photodetector 14 would be received by photodetector 15 and vice versa. Similarly, mirrors 33 and 35 could be replaced by any known redirecting means such as a prism or reflector. The circuit of FIGS. 1 and 2 can also be formed using optical fibers in the optical paths.

What is claimed is:

1. An optical heterodyne receiver comprising:
   a first and a second input terminal for receiving a polarized Differential Phase Shift Keyed (DPSK) modulated optical input signal from a remote location whose polarization state can vary randomly with time and a predetermined polarized optical local oscillator signal, respectively;
   combining means (10, 20) for combining the signals from the first and second input terminals and transmitting the combined signals along a first path;
   a polarizing beam splitter (11), for directing components of the combined signals from the combining and transmitting means which are polarized in a first polarization direction along a first branch and components which are polarized in a second direction, orthogonal to the first polarization direction, along a second branch, the polarizing beam splitter being oriented to divide the power of the polarized optical local oscillator signal received in the combined signals substantially equally into the first and second branches;
   a first and a second photodetector (14, 15) disposed in the first and second branch, respectively, for detecting the components of the combined signals propagating in the respective first and second branch and generating representative electrical signals at an output thereof;
   first generating means (16-19) responsive to the output electrical signal from the first photodetector for dividing the electrical signal into two equal parts and multiplying one undelayed part by the other part delayed by a bit duration and generating an output signal which is a baseband signal whose magnitude is the square of a magnitude of the current in each part and whose phase is equal to the phase difference between the two parts of the current wherein the effect of the randomly varying phase due to the polarization of the optical input signal at the first input terminal is directly eliminated;
   second generating means (16-19) responsive to the output electrical signal from the second photodetector for dividing the electrical signal into two equal parts and multiplying one part by the other part delayed by a bit duration and generating an output signal which is a baseband signal whose magnitude is the square of a magnitude of the current in each part and whose phase is equal to the phase difference between the two parts of the current wherein the effect of the randomly varying phase due to the polarization of the optical input signal at the first input terminal is directly eliminated; and
   adder means for adding the output signals from the first and second generating means to produce an output signal which is independent of the polarization state of the received optical input signal for subsequent detection and data recovery.

2. An optical heterodyne receiver according to claim 1 wherein the combining and transmitting means comprises a directional coupler.

3. An optical heterodyne receiver according to claim 1 wherein the combining and transmitting means comprises:
   an optical beam splitter for both (a) combining the signals received at the first and second input terminals and (b) directing first and second substantially equal portions of the combined signals along first and second output paths, respectively; and
   polarization rotating means disposed in either one of the first and second output paths from the optical beam splitter for rotating the direction of polarization of the portion of the combined signals propagating in the one output path by $\pi/2$ radians; and
   the polarizing beam splitter is responsive to the signals propagating in the first and second output paths from the combining and transmitting means for coaxially aligning both (a) the first combined signal portion with a first polarization direction propagating in the first output path and the second combined signal portion with a second polarization direction propagating in the second output path into an output beam directed along the first branch, and (b) the first combined signal portion with a second polarization direction propagating in the first output path and the second combined signal portion with a first polarization direction propagating in the second output path into an output beam directed along the second branch.

4. An optical heterodyne receiver according to claim 3 wherein the redirecting means comprises a first and a second mirror disposed to, in combination, redirect the associated output path from the combining and transmitting means to intersect the other output path substantially perpendicular thereto.

5. An optical heterodyne receiver according to claims 1, 2 or 3 wherein the first and second generating means each comprise:
dividing means (17) for dividing the output signal from the associated photodetector into first and second substantially equal output signal portions for propagation along first and second paths, respectively;
delay means disposed in one of the first and second paths at the output of the dividing means for delaying a signal propagating therethrough for a predetermined period of time; and
multiplying means disposed to receive the delayed and undelayed output signal portions from the first and second paths for producing an output signal representative of the multiplication of the instantaneous delayed and undelayed signals.

* * * * *